Sept. 13, 1932.  W. HARGREAVES  1,877,457
SAFETY VALVE
Filed March 14, 1930  2 Sheets-Sheet 1
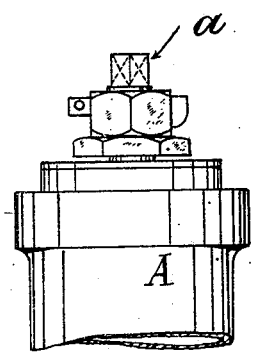
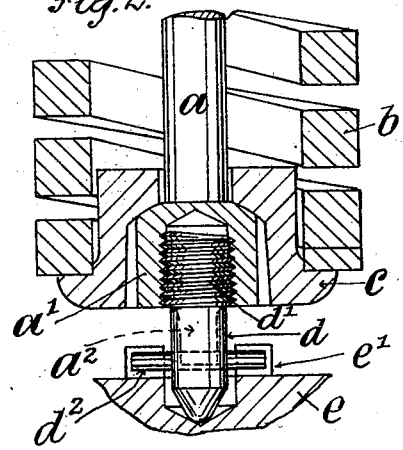
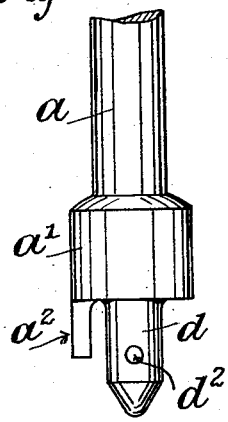
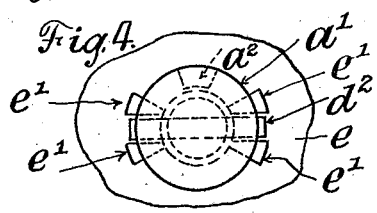
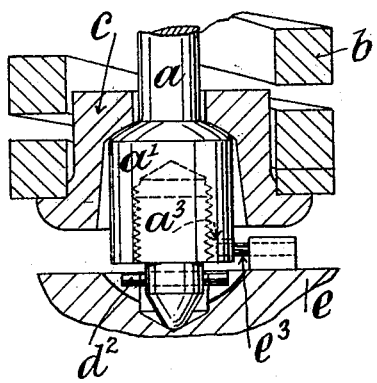
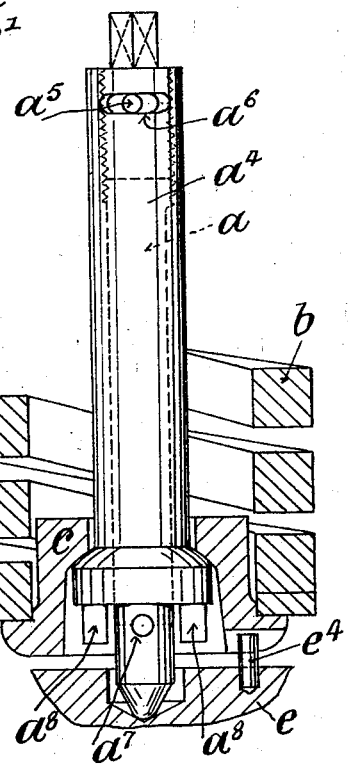
INVENTOR
WILLIAM HARGREAVES
ATTORNEYS

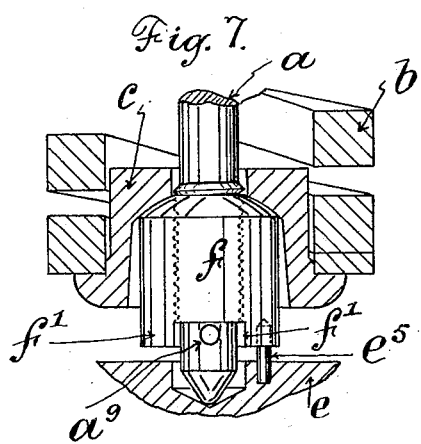
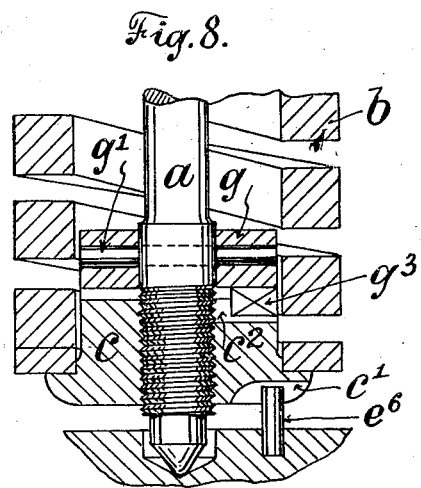
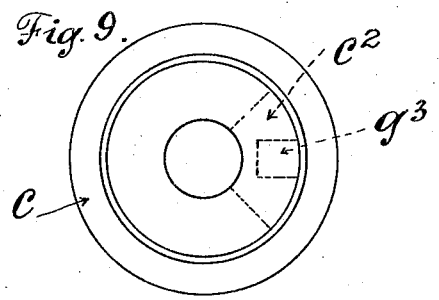
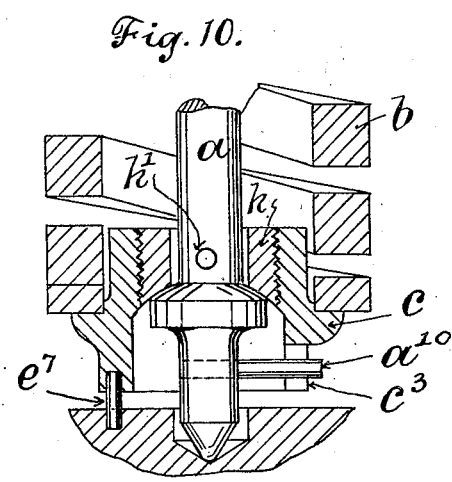
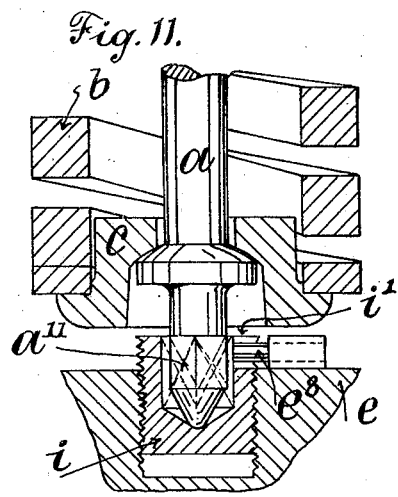

Patented Sept. 13, 1932

1,877,457

UNITED STATES PATENT OFFICE

WILLIAM HARGREAVES, OF TIMPERLEY, ENGLAND, ASSIGNOR OF ONE-HALF TO R. L. ROSS AND COMPANY LIMITED, OF STOCKPORT, ENGLAND

SAFETY VALVE

Application filed March 14, 1930, Serial No. 435,751, and in Great Britain April 25, 1929.

This invention relates to safety valves for steam generators or other vessels containing fluids under pressure, and particularly to safety valves for the boilers of locomotives.

It is known to provide means which permit of adjustment of the contained spring so that regulation (within limits) as to the pressure at which the valve will lift or become operative can be arranged for. A known arrangement is, to use a compression screw or adjusting device which engages a screw-thread cut on the interior of the valve casing. Other arrangements to this end also exist, but apart from the provision in United States specification 1,665,850, to alter a setting once arranged for in a sealed-up safety valve, it has been necessary to break the seal before access could be had to the compression screw or adjusting device.

As is known, once a safety valve has left the testing plate and been sealed-up it is highly important that no interference should occur—save by the makers or the most highly skilled officials, hence the careful sealing-up following test.

In actual practice I believe it would be a convenience to provide for a slight or predetermined adjustment or alteration in the setting of a valve up or down by the less highly skilled, whereby when a valve has been fixed and is bedded down and put to work (or when conditions are slightly changed) minor regulations up or down as to the pressure at which the valve will blow can be permitted without breaking the seal or otherwise disturbing internal mechanism.

This I propose to arrange for in this sense. I so arrange matters as to be able to add to or relieve the spring pressure within pre-arranged limits up or down, and to be able to do this without breaking the seal or interfering with the mechanism of the valve which is sealed-up by the makers.

As the only part of the valve mechanism which can conveniently emerge is the valve spindle, it is this I modify and arrange to act on to affect the spring either by slightly adding to or subtracting from the effective pressure of the spring.

Consequently I so construct, apply to, combine, and mount the said valve spindle, that if same is actuated externally, the valve spindle will so act or function as to add slightly to the pressure exerted by the spring, or slightly relieve the spring pressure as may be desired and according as to whether adjustment is to be up or down. Provision is made such as will strictly limit the possible adjustment from outside.

Two obvious ways are, (1) to extend or contract the valve spindle in effective length, (2) to utilize a part or parts which rotation or movement of the valve spindle affects for the end in view, but any means which are operative on a partial rotation or movement of the valve spindle or of means mounted on the said spindle for the end in view are within the scope of my invention, provided the protruding spindle element itself is directly or indirectly actuated for the purposes mentioned.

The accompanying drawings illustrate various mechanical arrangements in connection with the spindles of safety valves, whereby I can at will augment or deduct from the spring pressure within pre-arranged limits by simply acting on the valve spindle.

In the said drawings:—

Fig. 1 is a diagram of a type of "pop" safety valve indicating that the upper end of the valve spindle is usually the only part which, protruding from the casing, is available for the purposes of our invention.

Figs. 2, 3 and 4 show a two-part spindle combination and whereby the object of the invention can be carried out.

Fig. 5 indicates another two-part spindle arrangement.

Fig. 6 shows a further modification.

Fig. 7 shows another modification.

Figs. 8 and 9 indicate another modification.

Figs. 10 and 11 shows two further modifications.

In the drawings I represent by Fig. 1 the top of a typical safety valve A of the "pop" type with the upper end of the valve spindle emerging and marked a and the spindle extremity is prepared for the application of a spanner or tool at such time as may be requisite to turn the spindle through a limited number of degrees. I have marked the spring $b$ and the lower spring cap $c$. In the example Figs. 2, 3 and 4, the valve spindle $a$ has an enlarged lower extremity $a^1$ with depending limb $a^2$ and the extremity $a^1$ is bored and has a screw-thread cut in the bore. I provide a short lower or auxiliary shank $d$ and the upper part has a screw-thread $d^1$ cut thereon, whilst the lower end is machined to rounded, conical or other form and a cross pin $d^2$ is passed at right-angles through the shank $d$. The rounded, conical end of the shank $d$ fits a shaped seating recess in the actual liftable valve element $e$, and on the upper face of such valve element $e$ abutments $e^1$ are provided. The cross-pin $d^2$ fitting between the abutments $e^1$ holds the shank $d$ against turning movement. If a spanner or other tool be applied to the head of the spindle $a$, then said spindle $a$ can be rotated to a slight extent to right or left of the position seen in Fig. 4, and by reason of the screwed lower extremity $a^1$ of the spindle $a$ acting on the screw-threaded shank $d$ the effective length of the built-up spindle will be slightly added to or reduced. The depending finger $a^2$ working between two abutments $e^1 e^1$ restricts the possible turning movement of the spindle $a$ to what is the prescribed limits up or down from an intermediate setting.

Referring to Fig. 5 the shank has a cross-pin $d^2$ held in a machined recess in the valve element $e$. The enlarged lower extremity $a^1$ has a quadrant shaped gap $a^3$ cut in the annular side wall and an abutment pin $e^3$ protrudes into such gap $a^3$.

Fig. 6 shows the valve spindle $a$ as fitted with a sleeve $a^4$ there being a screw-thread on the spindle exterior and sleeve interior. The lower spring cap $c$ is fixed against turning by a pin $e^4$ projecting from the valve element $e$ into a slot in the lower spring cap. The limits of turning movement of the spindle $a$ relative to the valve proper are shown as defined by pin $a^5$ and slot $a^6$ or by a pin $a^7$ and depending abutments $a^8$.

In Fig. 7 the spindle $a$ screws into a provided nut-like base piece $f$, the screw thread cut in the latter engaging the lower screw-threaded end of the said spindle $a$, the shaped extremity of which rests in a recess in the valve element $e$. The lower spring cap $c$ sits on the nut-like base piece $f$ and a pin $e^5$ projecting from the valve element $e$ and engaging $f$ prevents the latter from turning. A pin $a^9$ working to abutments $f^1 f^1$ limits the turning movement of the valve spindle $a$ relative to the valve proper.

In the structure, Fig. 8, the valve spindle $a$ is screw-threaded and the lower extremity fits into the valve element. The lower spring cap $c$ is screw-threaded and fits the screw-threaded extremity of the valve spindle $a$ as shown. This lower spring cap $c$ is prevented from turning by the pin $e^6$ projecting into the groove $c^1$, whilst a thick disc $g$ fixed by a pin $g^1$ to the valve spindle $a$ has a depending projection $g^3$ which plays in the quadrant recess $c^2$ in the lower spring cap $c$ (see Fig. 9).

Fig. 10 shows the lower spring cap $c$ formed as a nut and held by the pin $e^7$ and the valve spindle $a$ has a ring $h$ screw-threaded externally and sitting on a shoulder as shown and fixed to the valve spindle by a pin $h^1$. The shaped lower end of the valve spindle fits the valve element proper and there is a pin $a^{10}$ movable within the confining limits of a quadrant shaped slot $c^3$.

In Fig. 11 the valve spindle $a$ has a squared or irregular bottom portion marked $a^{11}$ and this sockets in a correspondingly bored block $i$ screw-threaded on the exterior; the block $i$ fitting a screw-threaded cavity in the valve element $e$. If the valve spindle be turned, the block $i$ is moved. A pin $e^8$ projects into a quadrant shaped slot $i^1$ in the block $i$ and engages a stop on the valve proper so that the turning movement of block $i$ is limited relative to the said valve proper.

I declare that what I claim is:

1. A safety valve for vessels under fluid pressure, comprising a housing, means for closing and sealing said housing, a spindle mounted for rotation in said housing and protruding from the housing at one end thereof, said end being engageable for rotating the spindle, a spring-pressed member disposed on said spindle, a valve proper adjacent the lower end of the valve spindle, means associated with said spindle and said valve proper and effective on the rotation of the spindle to vary the operative length of said spindle thereby to increase or diminish the spring tension on said member, and means for expressly controlling the rotary movement of the spindle in either direction within narrow limits relative to the valve proper.

2. A safety valve for vessels under fluid pressure, comprising a housing, means for closing and sealing said housing, a spindle mounted for rotation in said housing and protruding from the housing at one end thereof, said end being engageable for rotating the spindle, a spring-pressed member disposed on said spindle, a valve proper with which the lower end of the spindle co-operates, and means combined with the lower end of said spindle and effective on manual rotation of the upper end of the spindle to vary the operative length of said spindle thereby to increase or diminish the spring tension on said member, and means combined with the valve proper and the lower end of said spindle permitting rotary movement of the spindle within strict limits relative to the valve proper.

3. A safety valve for vessels under fluid pressure comprising a housing, means for closing and sealing said housing, a spindle mounted for rotation in said housing and protruding from the housing at one end thereof, said end being engageable for rotating the spindle, a spring-pressed member disposed on said spindle, a valve proper upon which said spindle bears, means in threaded engagement with the lower end of the spindle and effective on the rotation of the spindle to vary the operative length of said spindle, means cooperating with the valve proper and the lower end of the spindle for limiting the rotary movement of the spindle relative to the valve proper.

4. A safety valve for vessels under fluid pressure, comprising a housing, means for closing and sealing said housing, a spindle mounted for rotation in said housing, means associated with the outer end of the spindle for imparting rotary motion thereto, means for limiting said rotary motion, a spring cap disposed on said spindle adjacent to its lower end, a spring seated on said cap and encircling said spindle, a valve proper, means combined with said spindle and bearing on said valve proper, means associated with the spindle and the valve proper and effective on rotation of the valve spindle to vary the operative length of the spindle thereby to adjust the tension of the spring, and means for limiting the turning movement of said valve spindle relative to the valve proper for the described purposes.

5. A safety valve for vessels under fluid pressure, comprising a housing, means for closing and sealing said housing, a spindle mounted for rotation in said housing, a valve proper with which said spindle cooperates, means associated with the spindle for imparting rotary motion thereto, means for limiting said rotary motion relative to the valve proper, a spring cap disposed on said spindle adjacent to its lower end, a spring seated on said cap and encircling said spindle, means in threaded engagement with the spindle and effective on rotation thereof to vary the operative length of the spindle thereby to adjust the tension of the spring, for the purposes set forth.

In testimony whereof I have signed my name to this specification.

WILLIAM HARGREAVES.